(12) United States Patent
Wang et al.

(10) Patent No.: US 8,238,031 B2
(45) Date of Patent: Aug. 7, 2012

(54) EYE PIECE AND TUNABLE CHROMATIC DISPERSION COMPENSATOR USING THE SAME

(75) Inventors: Peng Wang, Shanghai (CN); Hongxing Dai, Shanghai (CN)

(73) Assignee: Alcatel Lucent, Paris (FR)

( * ) Notice: Subject to any disclaimer, the term of this patent is extended or adjusted under 35 U.S.C. 154(b) by 68 days.

(21) Appl. No.: 12/735,340

(22) PCT Filed: Jan. 8, 2008

(86) PCT No.: PCT/CN2008/000053
§ 371 (c)(1),
(2), (4) Date: Aug. 5, 2010

(87) PCT Pub. No.: WO2009/086699
PCT Pub. Date: Jul. 16, 2009

(65) Prior Publication Data
US 2010/0302645 A1    Dec. 2, 2010

(51) Int. Cl.
G02B 25/00    (2006.01)
H04J 14/02    (2006.01)
(52) U.S. Cl. .............. 359/643; 398/81; 398/82; 398/87
(58) Field of Classification Search .......... 359/643–647; 398/81, 147, 82, 87, 88
See application file for complete search history.

(56) References Cited

U.S. PATENT DOCUMENTS

| 4,875,766 | A  | 10/1989 | Shimodaira et al. |
| 6,832,020 | B2 | 12/2004 | Okada et al. |
| 7,174,063 | B2 | 2/2007  | Doerr et al. |
| 7,197,211 | B2 | 3/2007  | Okada et al. |
| 2003/0016908 | A1 | 1/2003 | Okada et al. |
| 2005/0041921 | A1 | 2/2005 | Okada et al. |
| 2006/0198577 | A1 | 9/2006 | Doerr et al. |
| 2006/0203344 | A1 | 9/2006 | Miura et al. |
| 2007/0165297 | A1 | 7/2007 | Sandner et al. |

FOREIGN PATENT DOCUMENTS

| CN | 1828352 | 9/2006 |
| CN | 1982201 | 6/2007 |
| EP | 1 278 081 | 1/2003 |
| JP | 2002-072034 | 3/2002 |
| JP | 2005-037709 | 2/2005 |

OTHER PUBLICATIONS

International Search Report.
C. R. Doerr, "Optical Compensation of System Impairments," Mar. 5-10, 2006, OFC 2006.

(Continued)

*Primary Examiner* — Jack Dinh
(74) *Attorney, Agent, or Firm* — Harness, Dickey & Pierce

(57) ABSTRACT

In an example embodiment, lightwave device for use in a dispersion compensator, includes a light coupler configured to direct light toward a grating structure. The light coupler includes a first strip including a first material and a second strip attached to the first strip. The second strip includes a second material, and the second material has an expansion coefficient different than the first material. The first and second strips form a deformable reflector. A thermoelectric unit is coupled to the light coupler and is configured to adjust a shape of the deformable reflector based on a temperature of the thermoelectric unit. A support member is connected to the light coupler and is configured to position the deformable reflector so to receive light for transmission to the grating structure. Another embodiment provides a dispersion compensator using the lightwave device.

14 Claims, 4 Drawing Sheets

OTHER PUBLICATIONS

C.R. Doerr et al., "40-Gb/s colorless tunable dispersion compensator with 1000-ps/nm tuning range employing a planar lightwave circuit and a deformable mirror," Mar. 6-10, 2005, OFC 2005.

F. Van Laere et al., "Compact grating couplers between optical fibers and Silicon-on-Insulator photonic wire waveguides with 69% coupling efficiency," Mar. 5-10, 2006, OFC 2006.

Bin Wang et al., "Compact slanted grating couplers," Jul. 26, 2004, vol. 12, No. 15, Optics Express 3313.

PRIOR ART

EYE PIECE AND TUNABLE CHROMATIC DISPERSION COMPENSATOR USING THE SAME

BACKGROUND OF THE INVENTION

1. Field of Invention

The present invention relates to the optical networking field, and in particular to an optical device and a dispersion compensator using the device.

2. BACKGROUND

Chromatic dispersion compensation may be necessary for optical networks; and tunability may be the key for reconfigurable or agile networks. Current tunable methods typically cannot compensate the chromatic dispersion slope of the optical fiber over a specific wavelength range (e.g. C band), which is an important problem for DWDM systems, though the amount of chromatic dispersion can be tuned.

Conventional chromatic dispersion compensators typically use specially designed optical fibers, which are expensive, and can not be tuned. Next generation optical networks may need cheaper and agile devices, and thus tunability or reconfigurability are desirable. Tunable dispersion compensation is typically one of the blocking factors for realizing agility of next generation optical networks. Some tunable dispersion compensating modules (DCMs) e.g. Fiber Bragg Grating (FBG) and etalon based DCMs are developed but they may not be satisfactory since they are not capable of compensating the dispersion slope of the fiber used for telecommunication (see Reference 1, Christopher R. Doerr, *Optical compensation of system impairments*, 5-10 Mar. 2006, OFC 2006).

FIG. 1 shows an optical pulse before entering optical fiber 101 (100), after exiting optical fiber 101 and before entering dispersion compensator 102 (120), and after exiting dispersion compensator 102 (140). An optical pulse consists of different chromatic components. When traveling through a medium e.g. a single mode optical fiber (referring to 101 in FIG. 1), the different components of light have different speeds, so these chromatic components get dispersed after traveling a distance, and the extent of the dispersion is proportional to the traveling distance of the medium (referring to 120 in FIG. 1). The dispersion of different chromatic components causes "distortion" of the shape of the optical pulse thus degrades the transmission performance of the digital networks. Compensation of the chromatic dispersion can help restore the "distorted" optical pulse thus improving the transmission performance of the digital networks.

Future optical networks may need reconfigurability, this is because the traveling distance needed for the optical pulse may vary with different network configurations, as a result the amount of the dispersion to be compensated should also be reconfigurable, or, tunable.

Particularly, FIG. 2 is an exemplary schematic diagram showing the usage of Tunable Chromatic Dispersion Compensator (TCDC) in an agile optical network. As shown in FIG. 2, when changing network transmission configuration from a first configuration A to B to a second configuration A to C by the optical router 201, transmission distance also changes from A-B to A-C, in this case the Tunable Chromatic Dispersion Compensators (TCDCs) 202 are needed to perform reconfigurability.

FIG. 3 shows an exemplary schematic overall diagram of the Tunable Chromatic Dispersion Compensator (TCDC) 202. The single channel TCDC 202 mainly consists of a dispersive grating 301, a telescope structure (302 and 303), a single mode waveguide 304 and a tangential coupling grating 305. The dispersive grating 301 disperses the light to a small angle, the telescope structure, which consists of an object lens 302 and an eye piece 303, can magnify this angle by a factor of $f_o/f_e$, where $f_o$ and $f_e$ are the focal lengths of the object lens and eye piece 303 respectively. Light exiting the eye piece 303 will be coupled to the arc single mode waveguide 304 by the arc tangential coupling grating 305, thus different colors experience different delay after exiting the pigtail, so dispersion is compensated. If the radius of the arc is r, dispersed angle is 2θ, then the maximum dispersion distance able to be compensated is 2rθ.

As discussed before, the "maximum compensated dispersion distance" is:

$$2r\theta = 2r \times \arctan\left(\tan(\alpha)\frac{f_o}{f_e}\right)$$

The amount of the compensated dispersion can be tuned by changing the magnification factor of the telescope structure (302 and 303) as shown in FIG. 3. The focal length of the object lens 302 is fixed in this solution, so a deformable mirror with a variable focal length can be used for the eye piece 303. A kind of deformable mirror using piezo-electric actuators is proposed in a publication by Chris R. Doerr (see Reference 2, C. R. Doerr, et. al., *40-Gb/s colorless tunable dispersion compensator with 1000-ps/nm tuning range employing a planar lightwave circuit and a deformable mirror*, 6-10 Mar. 2005, OFC 2005).

The present invention is intended to overcome at least some the above problems for "tunable DCMs" for future dynamically reconfigurable optical networks.

SUMMARY OF THE INVENTION

According to some embodiments there is provided a device adapted to be used for optical networking to overcome the above problems for "tunable DCMs" for future dynamically reconfigurable optical networks.

Some embodiments provide a dispersion compensator using the device as disclosed herein.

According to an embodiment of the disclosure, device comprises a light coupler adapted to direct light toward a grating structure, the light coupler comprises a first strip including a first material and a second strip attached to the first strip, the second strip including a second material, the second material having an expansion coefficient different than the first material, wherein the first and second strips form a deformable reflector; and a thermoelectric unit coupled to the light coupler to adjust a shape of the deformable reflector based on a temperture of the thermoelectric unit; and a support member connected to the light coupler for positioning the deformable reflector so to receive light for transmission to the grating structure.

According to a second embodiment of the disclosure, a dispersion compensator is proposed, which comprises a device adapted to direct light toward a grating structure, comprising; a first strip including a first material; and a second strip attached to the first strip, the second strip including a second material, the second material having an expansion coefficient different than the first material, wherein the first and second strips form a deformable reflector; and a thermoelectric unit coupled to the light coupler to adjust a shape of the deformable reflector based on a temperature of the thermoelectric unit; and a support member connected to the light coupler for positioning the deformable reflector so to receive light for transmission to the grating structure.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which.

DETAILED DESCRIPTION OF PREFERRED EMBODIMENTS

Hereunder, some embodiments of the disclosure will be described with reference to the drawings. In the following description, some particular embodiments are used for the purpose of description only, which shall not be understood as any limitation to the present invention but the examples thereof.

Figure 1:
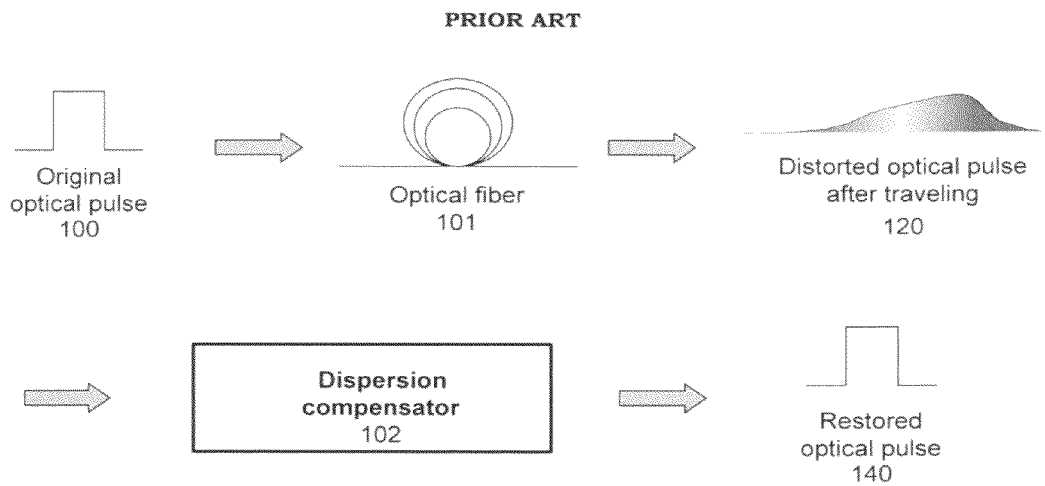
FIG. 1, which has been described, is an exemplary schematic diagram showing the dispersed and restored optical pulses.
Figure 2:
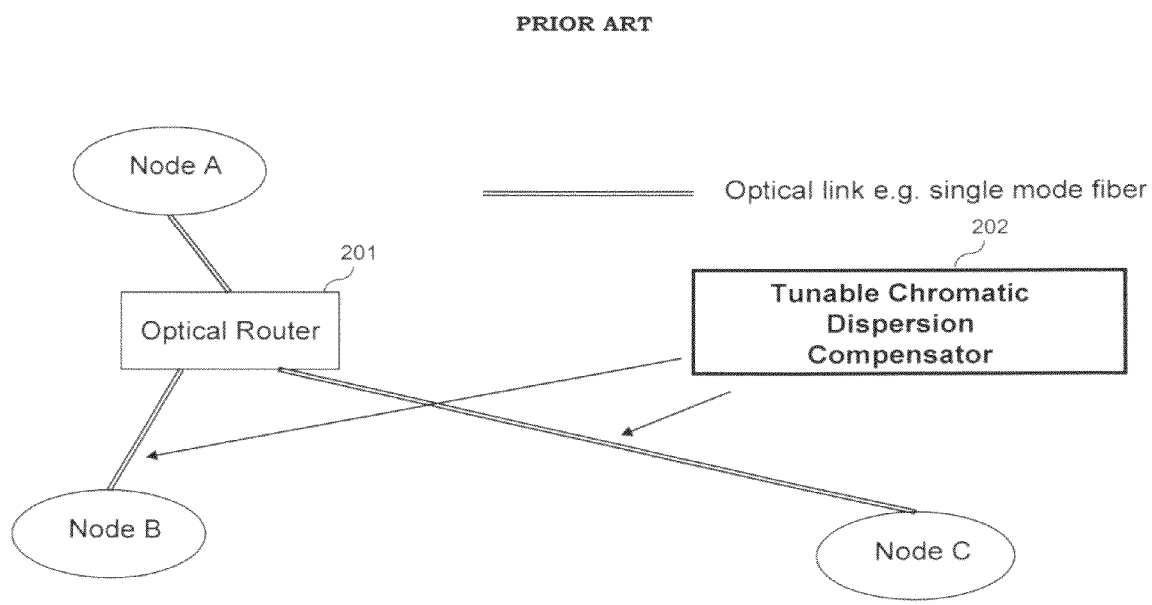
FIG. 2, which has been described, is an exemplary schematic diagram showing the usage of TCDC in an agile optical network.
Figure 3:
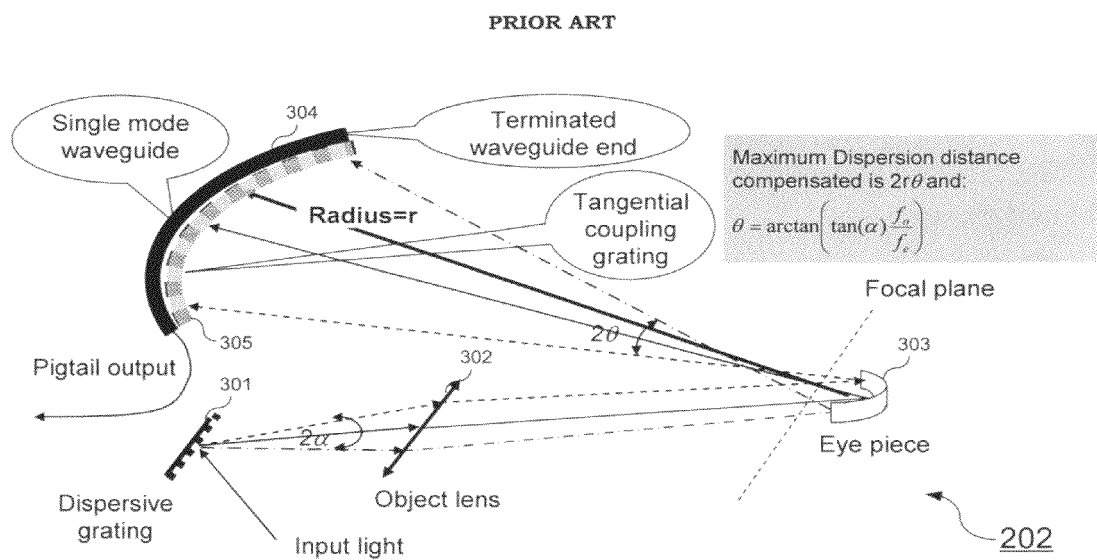
FIG. 3, which has been described, shows an exemplary schematic overall diagram of the Tunable Chromatic Dispersion Compensator (TCDC)
Figure 4:
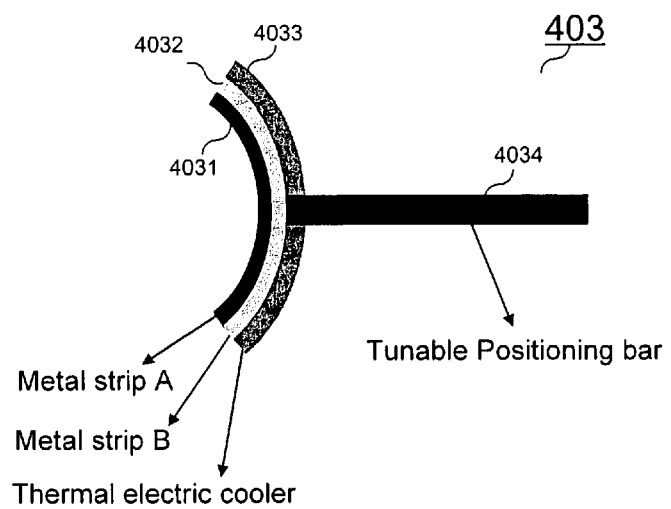
FIG. 4 illustrates a tunable eye piece provided according to an embodiment of the disclosure.

FIG. 4 shows an exemplary tunable eye piece 403 in a telescope provided according to some embodiments the present disclosure. As shown in FIG. 4, an eye piece 403 is a concave mirror 4031 made of metal A, and is attached onto a strip 4032 made of metal B, the metal A and metal B have different thermal expanding coefficients. For example, the metal A may have a smaller thermal expanding coefficient, and the metal B may have a larger thermal expanding coefficient. For example, the metal A is iron (Fe) and the metal B is copper (Cu), so that when the eye piece 403 is heated, it will be changed from a convex mirror into a concave mirror, and when the eye piece 403 is cooled, it will be changed from a concave mirror into a convex mirror. Alternatively, the metal A may have a larger thermal expanding coefficient, and the metal B may have a smaller thermal expanding coefficient, such as, copper (Cu) for use as the metal A and iron (Fe) for use for the metal B, so that when the eye piece 403 is heated, it will be changed from a concave mirror into a convex mirror, and when the eye piece 403 is cooled, it will be changed from a convex mirror into a concave mirror. Furthermore, it shall be noticed that the metal A (e.g. gold (Au)) or a reflection film (e.g. a gold (Au) film) (not shown) formed thereon is suitable to reflect the light within the wavelength range for which the chromatic dispersion is to be compensated. A TEC (thermal electric cooler) 4033 is attached onto metal stripe B on the opposite side opposite to the metal A. When heated or cooled by the TEC 4033, the focal length of (or, half radius of) the concave mirror will vary due to the different expansions of the metal strip A and metal strip B. When the eye piece 403 is changed from a concave mirror to a convex mirror, the sign of the compensated dispersion will change from positive to negative. A tunable positioning bar 4034 is attached onto the eye piece, which length can be varied by electrical means e.g. PZT (piezoelectric transducer) or thermal means e.g. metal with large thermal expanding coefficient in combination with a TEC. The purpose of the tunable positioning bar 4034 is to keep the telescope structure (302 and 303) as shown in FIG. 3 well tuned, or, in other words, to keep the focal planes of the object lens 302 and the eye piece 303 well overlapped while the focal length of the eye piece 303 is being changed.

Figure 5:
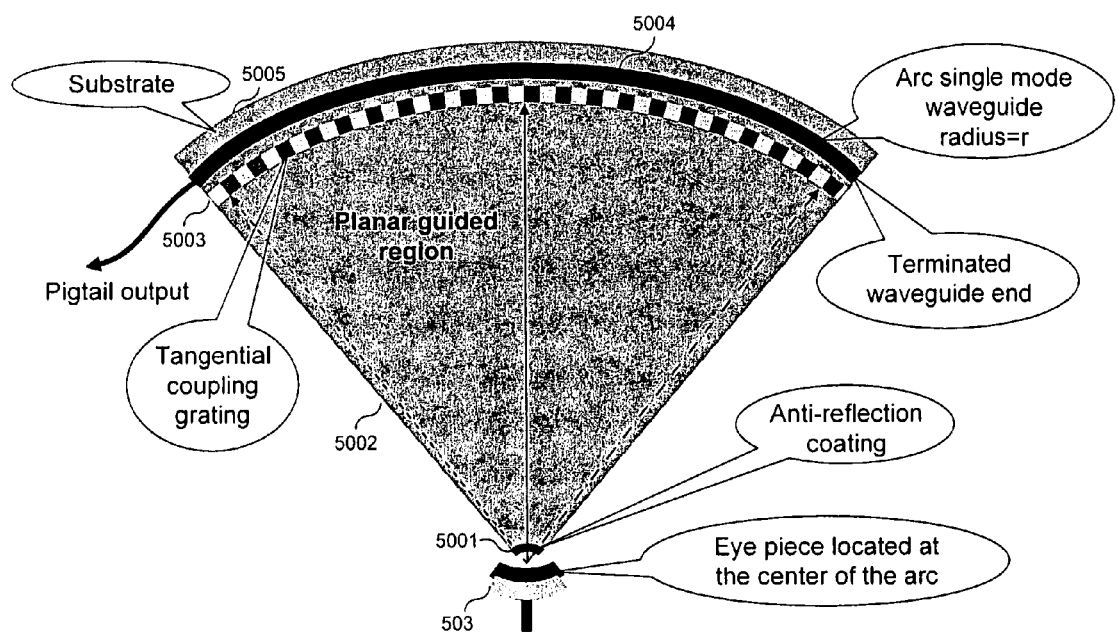
FIG. 5 illustrates the tangential coupling of the dispersed light from the eye piece (of the telescope) to the single mode waveguide.

FIG. 5 shows the eye piece 503 and the Planar Lightwave Circuit (PLC) devices (5001-5005), in which the dispersed light from the eye piece 503 (of the telescope) is tangentially coupled to the single mode waveguide 5004. The tangential coupling grating 5003 is designed to couple the light tangentially, or, in other words, to output light normal to the incident light, so the light exiting the grating 5003 will enter the single mode waveguide 5004 which is parallel to the grating 5003 itself. This kind of grating coupler is reported to have a coupling efficiency of 60-70% (see References 3 and 4: F. Van Laere, et. al., *Compact grating couplers between optical fibers and Silicon-on-Insulator photonic wire waveguides with 69% coupling efficiency*, 5-10 Mar. 2006, OFC 2006; and Bin Wang, et. al., Compact slanted grating couplers, 26 Jul. 2004, Vol. 12, No. 15, Optics Express 3313). Additionally, the relative positioning of the eye piece 503 with respect to the arc tangential coupling grating 5003 as shown in FIG. 5 is that the eye piece 503 is located substantially at the center of the arc, that is, at the radius "r" away from the arc tangential coupling grating 5003, all the time.

Figure 6:
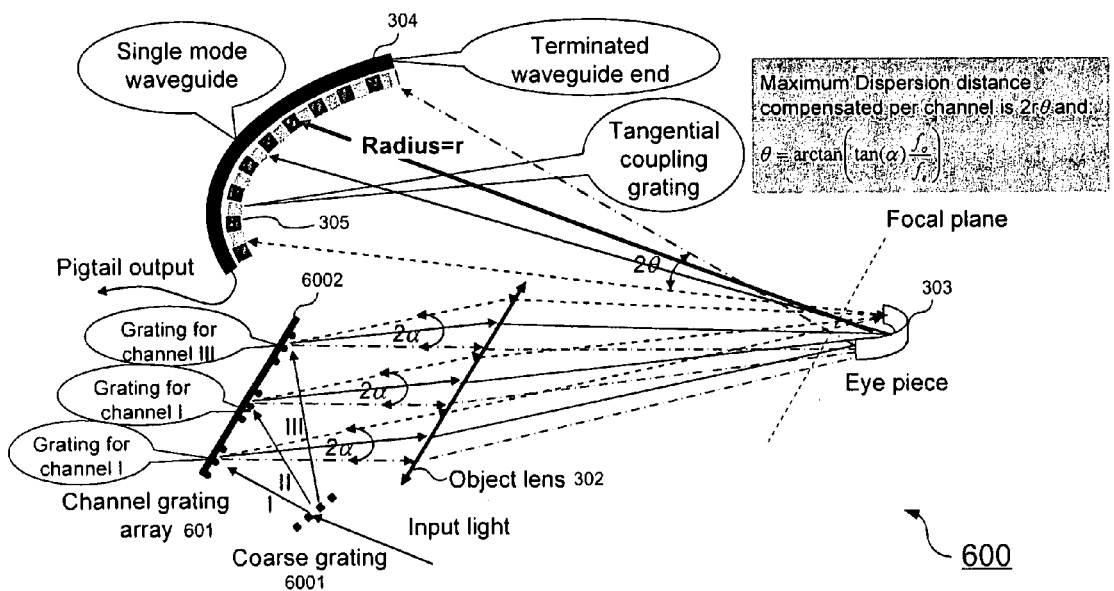
FIG. 6 illustrates a schematic overall diagram of a Multi-channel TCDC.

FIG. 6 schematically illustrates an exemplary overall diagram of a Multi-channel TCDC. A three-channel TCDC 600 is depicted in FIG. 6. The channel count can be bigger like 40 or more. Compared to the single channel TCDC 202, the difference of a multi-channel TCDC 600 is in that it utilizes a "coarse grating 6001" to disperse the channels from the input light, and the channels will be projected onto a grating array 601 instead of just one grating 301 as in the single channel TCDC 202. The remaining portion of the multi-channel TCDC 600 shares the same design with the single channel TCDC 202. All the gratings on the grating array 601 can diffract the center wavelengths of the channels in parallel. Thus all the channels share the same image area on the focal plane of the telescope structure (302 and 303). The TECs 6002 on the channel grating array 601 can be controlled to produce a desired temperature distribution (gradient), for example, a linear increasing/decreasing temperature distribution, along the grating array 601 which can vary the grating periods to get the slope compensation as needed in telecom systems.

Therefore, according to embodiments of the disclosure, the inventive TCDC may achieve the following technical advantages.

1. Tunable: the amount of the compensated dispersion can be tuned by adjusting the focal length of the eye piece via TEC attached to it. For example, if $2\theta=PI/4$ and $r=200$ mm, then the dispersion length is $L=2r\theta=2\times200$ mm$\times\pi/4=0.314$ m, assume the velocity of the light in the waveguide is $V=2\times10^8$ m/s and the effective bandwidth is $B=0.5$ nm, then the amount of the compensated dispersion is $CD=L/(B\times V)=0.314/(0.5\times 2\times10^8)=3140$ ps/nm, the sign of the compensated dispersion is decided by the eye piece, when the eye piece is a concave mirror, the sign is plus, when the eye piece is convex mirror, the sign is minus.

2. Multi-channel operating: suitable for dispersion compensation for DWDM system e.g. an 80-grating array can be designed for an 80 channel DWDM system.

3. Slope compensation, the dispersion slope can be compensated by introducing a specific temperature distribution (gradient) along the channel grating array, this feature makes the invention more attractive and practical since none of other tunable dispersion compensation method is capable of compensating the dispersion slope according to Reference 1 (Christopher R. Doerr, *Optical compensation of system impairments,* 5-10 Mar. 2006, OFC 2006).

4. Wide-band, cascadability: unlike other compensation solutions, the present invention has very wide pass-band so can be cascaded in long optical links.

The above embodiments are provided for the purpose of example only, and are not intended to limit the present invention. It is to be understood by those skilled in the art that there may be various modifications or replacements to the embodiments without departing from the scope and the spirit of the present invention, and they shall fall into the scope defined by the appended claims.

What is claimed is:

1. A device, comprising:
    a light coupler configured to direct light toward a grating structure, the light coupler including,
        a first strip including a first material, and
        a second strip attached to the first strip, the second strip including a second material, the second material having an expansion coefficient different than the first material, the first and second strips forming a deformable reflector;
    a thermoelectric unit coupled to the light coupler and configured to adjust a shape of the deformable reflector based on a temperature of the thermoelectric unit; and
    a support member connected to the light coupler and configured to position the deformable reflector so to receive light for transmission to the grating structure.

2. The device of claim 1, wherein at least one of the first material and the second material includes a metal.

3. The device of claim 1, wherein the light coupler is configured to receive light from at least one of a grating and a lens.

4. The device of claim 1, wherein the light coupler is configured to form a portion of a dispersion compensator.

5. The device of claim 1, wherein the deformable reflector is configured for aiding chromatic dispersion compensation.

6. The device of claim 1, further comprising:
    an optical assembly configured to include the light coupler to provide dispersion compensation.

7. The device of claim 1, wherein the grating structure includes a waveguide structure.

8. The device of claim 7, wherein the waveguide structure is in contact with a grating.

9. The device of claim 8, wherein the grating is formed from the waveguide structure.

10. The device of claim 1, wherein the grating structure includes a single mode optical fiber.

11. The device of claim 1, wherein the light coupler is positioned to receive light from at least one of a different grating structure and a lens.

12. The device of claim 1, wherein the light coupler is configured to receive channelized light.

13. The device of claim 1, further comprising:
    an optical assembly configured to include the light coupler, the optical assembly configured to reshape an optical pulse.

14. A dispersion compensator comprising a device, comprising:
    a device, the device including,
        a light coupler configured to direct light toward a grating structure, the light coupler including,
            a first strip including a first material, and
            a second strip attached to the first strip, the second strip including a second material, the second material having an expansion coefficient different than the first material, the first and second strips forming a deformable reflector, and
        a thermoelectric unit coupled to the light coupler and configured to adjust a shape of the deformable reflector based on a temperature of the thermoelectric unit, and
        a support member connected to the light coupler and configured to position the deformable reflector so to receive light for transmission to the grating structure.

\* \* \* \* \*